United States Patent
Shoji

(10) Patent No.: US 11,325,248 B2
(45) Date of Patent: May 10, 2022

(54) ROBOTIC DEVICE AND GRIPPING METHOD

(71) Applicant: KYOCERA Document Solutions Inc., Osaka (JP)

(72) Inventor: Haruki Shoji, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 143 days.

(21) Appl. No.: 16/876,811

(22) Filed: May 18, 2020

(65) Prior Publication Data

US 2020/0368902 A1 Nov. 26, 2020

(30) Foreign Application Priority Data

May 24, 2019 (JP) .............................. JP2019-097769

(51) Int. Cl.
*B25J 9/16* (2006.01)
*B25J 13/08* (2006.01)

(52) U.S. Cl.
CPC ............. *B25J 9/1612* (2013.01); *B25J 9/163* (2013.01); *B25J 13/081* (2013.01); *B25J 13/085* (2013.01)

(58) Field of Classification Search
CPC ........ B25J 9/1612; B25J 9/163; B25J 13/081; B25J 13/085; B25J 9/1669; B25J 9/1694; B25J 9/00; B25J 9/1602; G05B 2219/39487; G05B 2219/39507; G05B 2219/39508; G05B 2219/39509; G05B 2219/39514
USPC .................................................. 700/245–264
See application file for complete search history.

(56) References Cited

U.S. PATENT DOCUMENTS

| | | | | |
|---|---|---|---|---|
| 4,621,332 A | * | 11/1986 | Sugimoto .............. | B25J 13/085 318/568.17 |
| 4,860,215 A | * | 8/1989 | Seraji ................. | G05B 19/4163 901/45 |
| 4,999,553 A | * | 3/1991 | Seraji ..................... | B25J 9/1643 901/14 |
| 5,504,841 A | * | 4/1996 | Tani ......................... | B25J 9/161 706/903 |
| 5,631,861 A | * | 5/1997 | Kramer ................... | G06F 3/016 703/7 |

(Continued)

FOREIGN PATENT DOCUMENTS

JP 2005-177977 A 7/2005

OTHER PUBLICATIONS

Viña et al, Predicting Slippage and Learning Manipulation Affordances through Gaussian Process Regression, 2013, 13th IEEE-RAS International Conference on Humanoid Robots (Humanoids). Oct. 15-17, 2013. Atlanta, GA, pp. 462-468. (Year: 2013).*

(Continued)

*Primary Examiner* — Jaime Figueroa
(74) *Attorney, Agent, or Firm* — Studebaker & Brackett PC

(57) ABSTRACT

A robotic device includes an end effector device, a first sensor, and a controller. The end effector device includes two fingers for gripping a workpiece. The first sensor detects a pressure distribution on a gripping position on the workpiece by the two fingers. The controller performs, based on a temporal variation in the pressure distribution when the workpiece is lifted, posture control including rotation of the end effector device.

10 Claims, 4 Drawing Sheets

(56) References Cited

U.S. PATENT DOCUMENTS

| | | | | |
|---|---|---|---|---|
| 6,484,601 | B1* | 11/2002 | Arrichiello | B25J 9/14 294/106 |
| 7,258,379 | B2* | 8/2007 | Ono | B25J 9/142 294/119.3 |
| 7,370,896 | B2* | 5/2008 | Anderson | B25J 15/0009 294/106 |
| 9,782,902 | B1* | 10/2017 | Kim | B25J 15/0009 |
| 10,717,187 | B2* | 7/2020 | Iqtidar | B25J 11/005 |
| 10,953,553 | B2* | 3/2021 | Nakagawa | B25J 15/12 |
| 11,090,818 | B2* | 8/2021 | Curhan | B25J 15/12 |
| 11,179,851 | B2* | 11/2021 | Oaki | B25J 9/1671 |
| 2006/0145494 | A1* | 7/2006 | Nihei | B25J 9/1612 294/106 |
| 2011/0137463 | A1 | 6/2011 | Alcazar et al. | |
| 2014/0028040 | A1* | 1/2014 | Oda | B25J 15/0004 294/115 |
| 2015/0190931 | A1* | 7/2015 | Claffee | B25J 15/08 294/200 |
| 2016/0375590 | A1* | 12/2016 | Lessing | B25J 15/12 294/196 |
| 2017/0203443 | A1* | 7/2017 | Lessing | B25J 15/0616 |
| 2017/0217013 | A1* | 8/2017 | Iqtidar | B25J 15/0616 |
| 2019/0200987 | A1* | 7/2019 | Shelton, IV | A61B 17/07207 |
| 2019/0202070 | A1* | 7/2019 | Nakagawa | B25J 15/0023 |
| 2019/0299424 | A1* | 10/2019 | Curhan | B25J 15/10 |
| 2020/0215700 | A1* | 7/2020 | Bao | B25J 15/12 |

OTHER PUBLICATIONS

Ho et al, What Can Be Inferred From a Tactile Arrayed Sensor in Autonomous In-Hand Manipulation?, 2012, 8th IEEE International Conference on Automation Science and Engineering Aug. 20-24, 2012, Seoul, Korea, pp. 461-468 (Year: 2012).*

Su Zhe et al., "Force estimation and slip detection/classification for grip control using a biomimetic tactile sensor", 2015 IEEE-RAS 15th International Conference on Humanoid Robots (Humanoids), IEEE, pp. 297-303, Nov. 3, 2015, Seoul, Korea, XP032837575.

Hogan Francois R. et al., "Tactile Regrasp: Grasp Adjustments via Simulated Tactile Transformations", 2018 IEEE/RSJ International Conference on Intelligent Robots and Systems (IROS), IEEE, pp. 2963-2970, Oct. 1, 2018, Madrid, Spain, XP033490818.

The extended European search report issued by the European Patent Office dated Oct. 20, 2020, which corresponds to European Patent Application No. 20176017.0-1205 and is related to U.S. Appl. No. 16/876,811.

* cited by examiner

ROBOTIC DEVICE AND GRIPPING METHOD

INCORPORATION BY REFERENCE

The present application claims priority under 35 U.S.C. § 119 to Japanese Patent Application No. 2019-097769, filed on May 24, 2019. The contents of this application are incorporated herein by reference in their entirety.

BACKGROUND

The present disclosure relates to a robotic device and a gripping method.

When gripping and transporting a workpiece with a robotic device, the gripped workpiece may slip and fall due to the weight, shape, or surface state of the workpiece. Therefore, a robotic device is provided which increases gripping power to further prevent slippage when detecting slippage in the gripped workpiece.

SUMMARY

A robotic device according to an aspect of the present disclosure includes an end effector device, a first sensor, and a controller. The end effector device includes two fingers for gripping a workpiece. The first sensor detects a pressure distribution on a gripping position on the workpiece by the two fingers. The controller performs, based on a temporal variation in the pressure distribution when the workpiece is lifted, posture control including rotation of the end effector device.

A gripping method according to an aspect of the present disclosure is for gripping a workpiece using a robotic device including an end effector device and a first sensor. The end effector device includes two fingers. The first sensor is for detecting a pressure distribution on a gripping position of the workpiece by the two fingers. The gripping method includes: gripping the workpiece using the two fingers; detecting a pressure distribution on a gripping position on the workpiece; and performing, based on a temporal variation of the pressure distribution when the workpiece is lifted, posture control including rotation of the end effector device.

DETAILED DESCRIPTION

Figure 1:
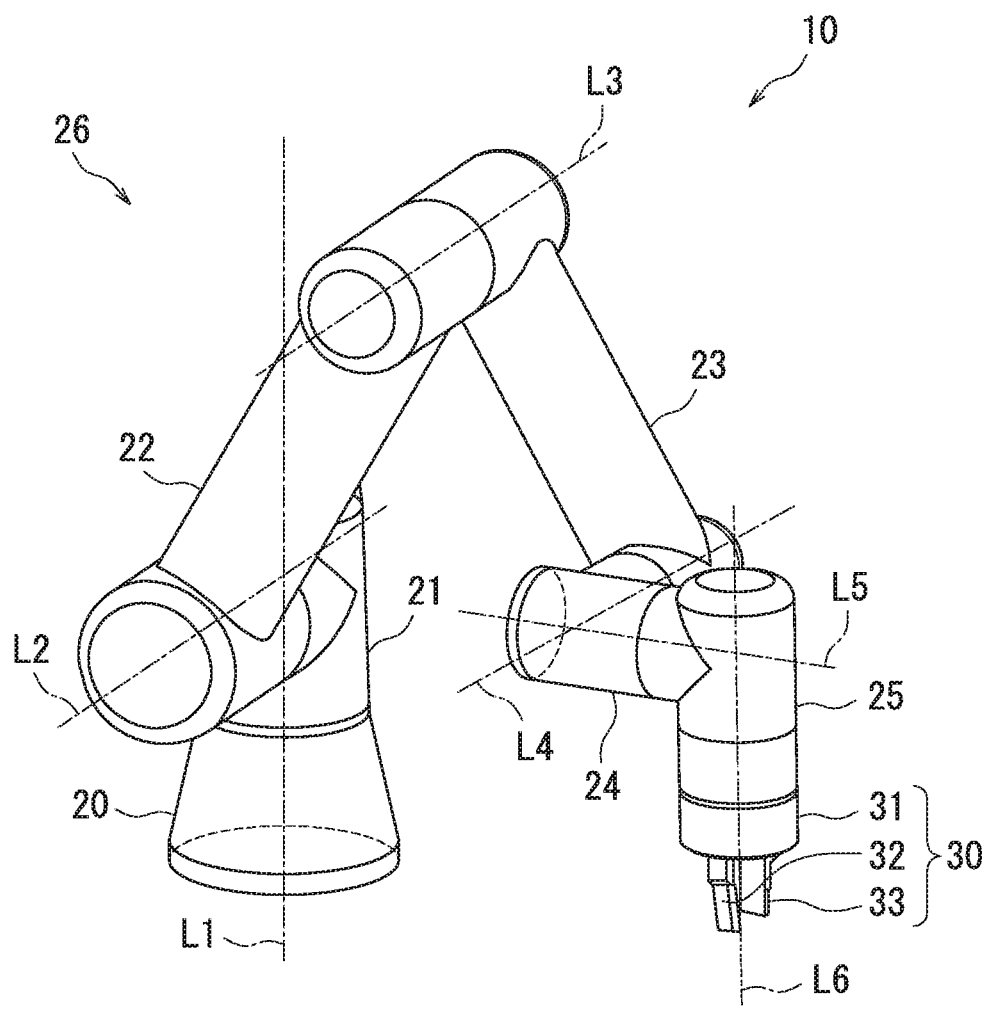
FIG. 1 is a perspective view of an appearance example of a robotic device according to an embodiment.

An embodiment of the present disclosure will hereinafter be described with reference to FIGS. 1 to 4. Elements that are the same or equivalent are labelled with the same reference signs in the drawings and description thereof is not repeated.

A robotic device 10 according to the embodiment will first be described with reference to FIG. 1. FIG. 1 is a perspective view of an appearance example of the robotic device 10. In FIG. 1, directions intersecting each other on a horizontal plane are a positive X axial direction and a positive Y axial direction, and upward in a vertical direction is a positive Z axial direction.

As illustrated in FIG. 1, the robotic device 10 includes a base 20, a robotic hand device 26, and an end effector device 30. The robotic hand device 26 is mounted on the base 20. The end effector device 30 is replaceable and connected to a distal end of the robotic hand device 26. The robotic hand device 26 drives the end effector device 30. Note that end effector may hereinafter also be referred to as "EE".

The robotic hand device 26 includes a plurality of arms coupled to each other. Specifically, the robotic hand device 26 includes a shoulder 21, a lower arm 22, a first upper arm 23, a second upper arm 24, and a wrist 25.

The shoulder 21 is coupled to the base 20 and allowed to pivot around a first axis L1 extending in a Z axial direction.

The lower arm 22 is coupled to the shoulder 21 and allowed to pivot around a second axis L2 extending in a direction intersecting the first axis L1 to move up and down.

The first upper arm 23 is coupled to a distal end of the lower arm 22 and allowed to pivot around a third axis L3 extending parallel to the second axis L2 to move up and down.

The second upper arm 24 is coupled to a distal end of the first upper arm 23 and allowed to twist and turn around a fourth axis L4 extending parallel to the third axis L3.

The wrist 25 is coupled to a distal end of the second upper arm 24 and allowed to pivot around a fifth axis L5 extending in a direction intersecting the fourth axis L4 to move up and down.

The EE device 30 is configured as a gripping mechanism that includes a housing 31, a first finger 32, and a second finger 33. The housing 31 is connected to a distal end of the wrist 25 and allowed to twist and turn around a sixth axis L6 extending in a direction intersecting the fifth axis L5. The first finger 32 and the second finger 33 protrude from an opening provided in the housing 31 so as to grip a workpiece.

Figure 2:
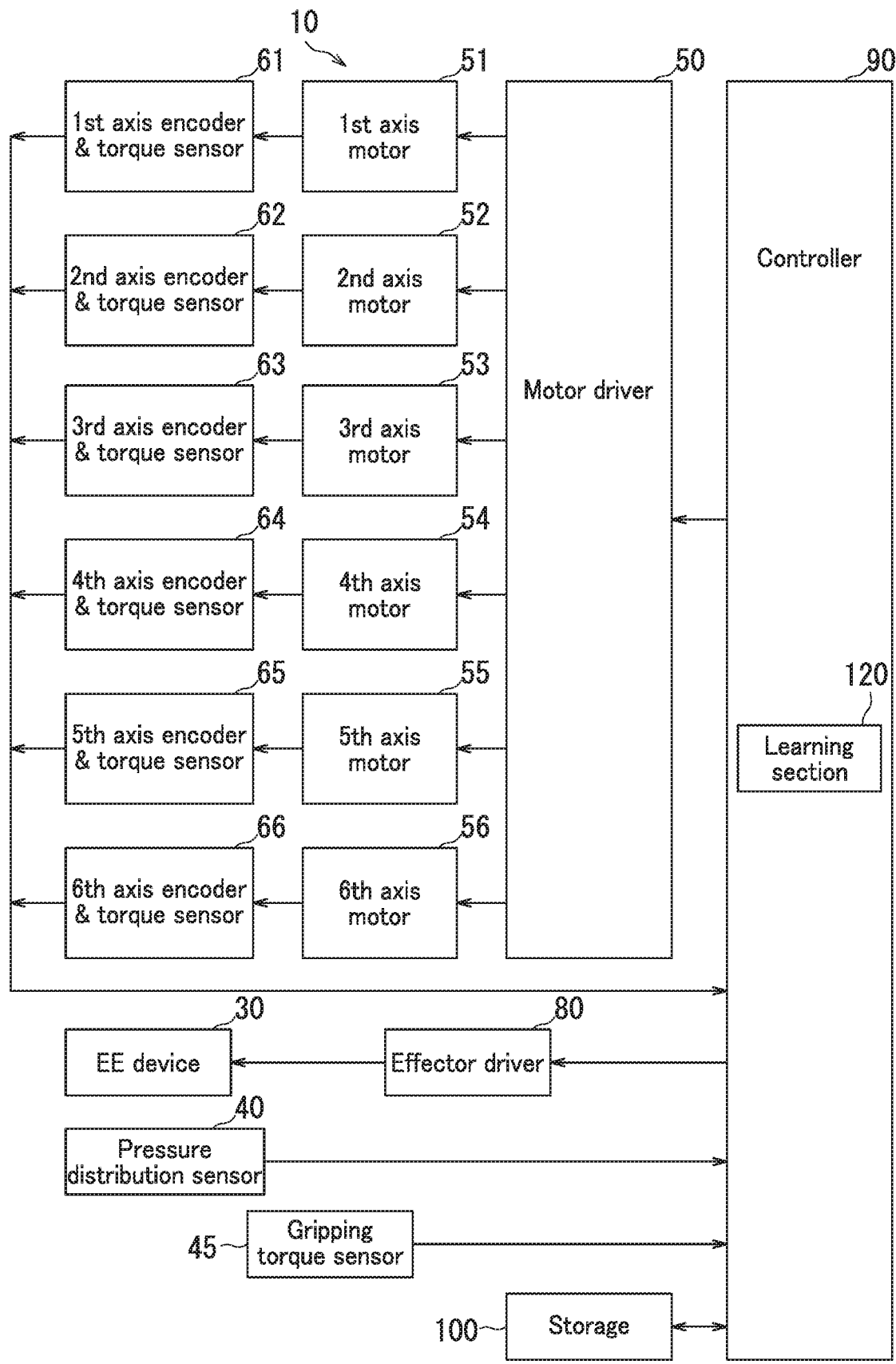
FIG. 2 is a block diagram illustrating an example of a circuit configuration of the robotic device.

A circuit configuration of the robotic device 10 will next be described with reference to FIGS. 1 and 2. FIG. 2 is a block diagram illustrating an example of the circuit configuration of the robotic device 10.

As illustrated in FIG. 2, the robotic device 10 includes a motor driver 50, a first axis motor 51, a second axis motor 52, a third axis motor 53, a fourth axis motor 54, a fifth axis motor 55, and a sixth axis motor 56. The motor driver 50 drives the first to sixth axis motors 51 to 56. The first axis motor 51 rotates the shoulder 21 around the first axis L1. The second axis motor 52 rotates the lower arm 22 around the second axis L2. The third axis motor 53 rotates the first upper arm 23 around the third axis L3. The fourth axis motor 54 rotates the second upper arm 24 around the fourth axis L4. The fifth axis motor 55 rotates the wrist 25 around the fifth axis L5. The sixth axis motor 56 rotates the ER device 30 around the sixth axis L6.

The robotic device 10 also includes a first axis encoder and torque sensor 61, a second axis encoder and torque sensor 62, and a third axis encoder and torque sensor 63. The robotic device 10 further includes a fourth axis encoder and torque sensor 64, a fifth axis encoder and torque sensor 65, and a sixth axis encoder and torque sensor 66. The first axis encoder and torque sensor 61 detects a rotational position and torque of the first axis motor 51 and outputs a first encoder signal and a first torque signal. The second axis encoder and torque sensor 62 detects a rotational position and torque of the second axis motor 52 and outputs a second encoder signal and a second torque signal. The third axis encoder and torque sensor 63 detects a rotational position and torque of the third axis motor 53 and outputs a third encoder signal and a third torque signal. The fourth axis encoder and torque sensor 64 detects a rotational position and torque of the fourth axis motor 54 and outputs a fourth encoder signal and a fourth torque signal. The fifth axis encoder and torque sensor 65 detects a rotational position and torque of the fifth axis motor 55 and outputs a fifth encoder signal and a fifth torque signal. The sixth axis encoder and torque sensor 66 detects a rotational position and torque of the sixth axis motor 56 and outputs a sixth encoder signal and a sixth torque signal.

The robotic device 10 further includes a pressure distribution sensor 40, a gripping torque sensor 45, an effector driver 80, a controller 90, and storage 100.

The controller 90 provides a control signal to the motor driver 50 to perform posture control of the robotic hand device 26. The first to sixth encoder signals which indicate the posture of the robotic hand device 26 are fed back to the controller 90. The first to sixth torque signals are also fed back to the controller 90.

The effector driver 80 drives the first finger 32 and the second finger 33. The controller 90 provides a control signal to the effector driver 80 to move the first finger 32 and the second finger 33. The pressure distribution sensor 40 and the gripping torque sensor 45 are embedded in the FE device 30.

The pressure distribution sensor 40 detects a pressure distribution on a gripping position on the workpiece by the first finger 32 and the second finger 33. An output signal from the pressure distribution sensor 40 is supplied to the controller 90. The pressure distribution sensor 40 is equivalent to an example of a "first sensor".

The gripping torque sensor 45 detects gripping torque on the workpiece. The gripping torque is torque of an unillustrated motor driving the first finger 32 and the second finger 33. The gripping torque sensor 45 is equivalent to an example of a "second sensor".

The controller 90 includes a neural network and a processor such as a central processing unit (CPU). The storage 100 includes a main storage device such as semiconductor memory and an auxiliary storage device such as a hard disk drive. The storage. 100 stores therein data and a computer program. The processor of the controller 90 executes the computer program stored in the storage 100, thereby controlling each component of the robotic device 10.

The controller 90 includes a learning section 120. The learning section 120 performs supervised learning based on a plurality of trials including gripping of the workpiece using the first finger 32 and the second finger 33 and movement and rotation of a tool center point (TCP) of the EE device 30. The learning is individually performed for each of a plurality of workpieces having mutually different shapes. The learning section 120 stores therein a result of the learning. The neural network of the controller 90 functions as the learning section 120. Note that the learning may be performed in a virtual environment.

The controller 90 performs posture control including rotation of the EE device 30 based on temporal variation in the pressure distribution when a workpiece is lifted.

Figure 3:
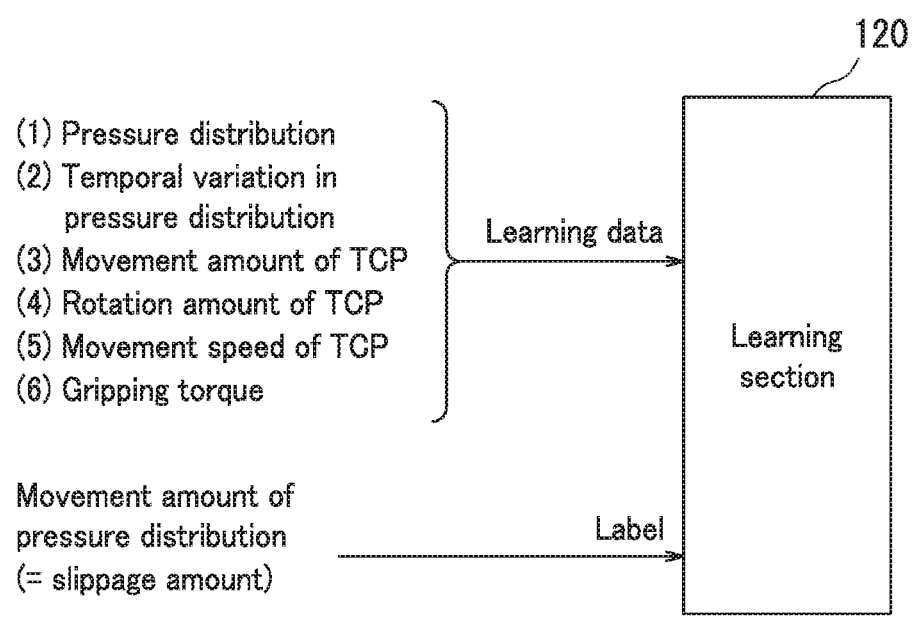
FIG. 3 is a block diagram illustrating an example of input to a learning section.

Input to the learning section 120 will next be described with reference to FIGS. 1 to 3. FIG. 3 is a block diagram illustrating an example of the input to the learning section 120.

As illustrated in FIG. 3, learning data and a label are provided to the learning section 120. The learning data includes (1) a pressure distribution, (2) a temporal variation in the pressure distribution, (3) a movement amount of the TCP, (4) a rotation amount of the TCP, (5) a movement speed of the TCP, and (6) a gripping torque. The pressure distribution is obtained from the output of the pressure distribution sensor 40. The gripping torque is obtained from the output of the gripping torque sensor 45. The label includes a movement amount of the pressure distribution, that is to say a slippage amount.

Specifically, having been provided as learning data the temporal variation in the pressure distribution and the movement amount and the rotation amount of the TCP, and having been provided as a label the movement amount of the pressure distribution after rotation, the learning section 120 performs supervised learning. Based on the result of the supervised learning, the learning section 120 determines the movement amount and the rotation amount of the TCP such that the movement amount of the pressure distribution after posture control by the controller 90 is small.

Having been further provided as learning data the gripping torque prior to rotation, the learning section 120 performs additional supervised learning. Based on the result of the additional supervised learning, under a condition where the movement amount of the pressure distribution after the posture control by the controller 90 is greater than a first threshold, the learning section 120 determines the gripping torque prior to the posture control such that the gripping torque prior to the posture control is small.

Under a condition where the movement amount of the pressure distribution after posture control by the controller 90 is greater than a second threshold, the learning section 120 additionally determines the movement speed of the TCP such that the movement speed of the TCP is high.

Having been further provided as learning data the gripping torque after rotation and the temporal variation in the pressure distribution after rotation, the learning section 120 performs additional supervised learning. Based on the result of the additional supervised learning, under a condition where the movement amount of the pressure distribution after the posture control by the controller 90 is greater than a third threshold, the learning section 120 determines the gripping torque after the posture control such that the gripping torque after the posture control is small.

Figure 4:
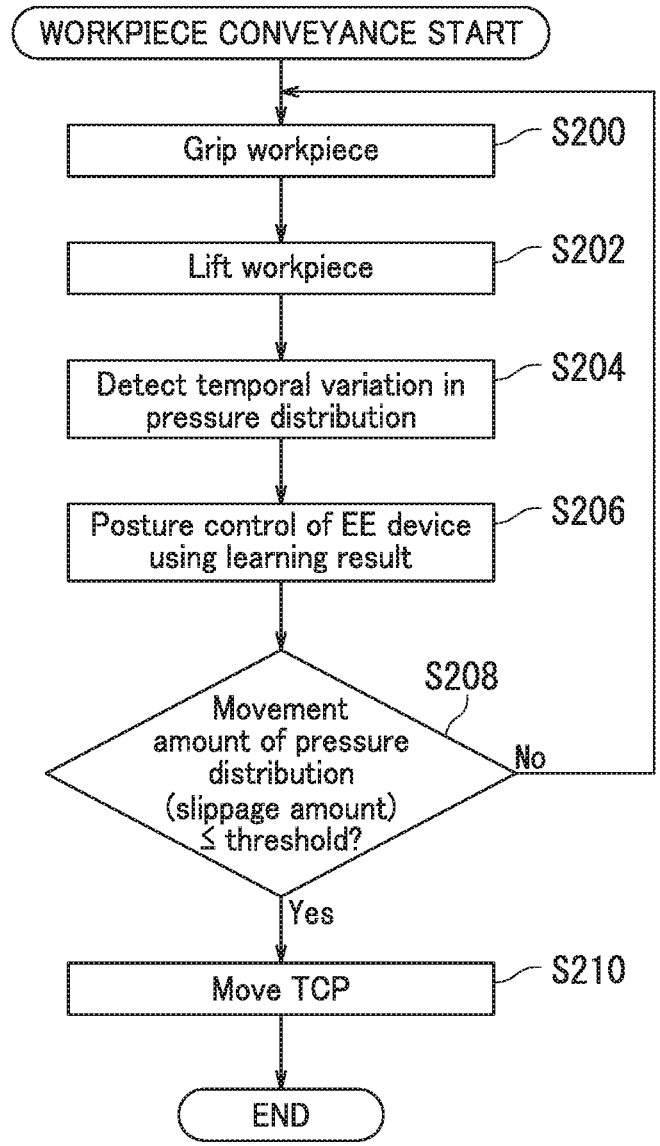
FIG. 4 is a flowchart depicting an example of workpiece conveyance control by a controller.

Workpiece conveyance control by the controller 90 will next be described with reference to FIGS. 1 to 4. FIG. 4 is a flowchart depicting an example of the workpiece conveyance control by the controller 90. The learning section 120 stores therein the result of supervised learning.

At Step S200: As illustrated in FIG. 4, the controller 90 controls the effector driver 80 so that the EE device 30 grips the workpiece using the first finger 32 and the second finger 33. The pressure distribution sensor 40 detects the pressure distribution on the gripping position on the workpiece. When Step S200 in the process ends, the process of the controller 90 proceeds to Step S202.

At Step S202: The controller 90 controls the motor driver 50 so that the robotic hand device 26 lifts the workpiece using the EE device 30. When Step S202 in the process ends, the process of the controller 90 proceeds to Step S204.

At Step S204: The controller 90 detects the temporal variation in the pressure distribution when the workpiece is lifted. When Step S204 in the process ends, the process of the controller 90 proceeds to Step S206.

At Step S206: The controller 90 performs posture control of the EE device 3C) using the result of the supervised learning of the learning section 120. That is, the controller 90 performs posture control including rotation of the EE device 3C) based on the temporal variation in the pressure distribution when the workpiece is lifted. When Step S206 in the process ends, the process of the controller 90 proceeds to Step S208.

At Step S208: The controller 90 determines whether or not the movement amount of the pressure distribution after posture control of the EE device 30, that is to say the slippage amount, is equal to or less than a fourth threshold. When the controller 90 determines that the movement amount of the pressure distribution is equal to or less than the fourth threshold (Yes in Step S208), the process of the controller 90 proceeds to Step S210. When the controller 90 determines that the movement amount of the pressure distribution is greater than the fourth threshold (No in Step S208), the process of the controller 90 returns to Step S200 so that gripping of the workpiece using the first finger 32 and the second finger 33 is retried.

At Step S210: The controller 90 controls the motor driver 50 to move the TCP of the EE device 30 to a desired position. When Step S210 in the process ends, the process of the controller 90 ends.

The embodiment provides the robotic device 10 capable of preventing a fall of the workpiece while suppressing gripping force.

The embodiment of the present disclosure is described above with reference to the accompanying drawings. However, the present disclosure is not limited to the above embodiment and may be implemented in various manners within a scope not departing from the gist thereof. Furthermore, various disclosures may be created by appropriately combining elements of configuration disclosed in the above embodiment. For example, some of elements of configuration may be removed from the entirety thereof disclosed in the embodiment. The drawings illustrate main elements of configuration schematically to facilitate understanding thereof. Aspects of the elements of configuration such as number illustrated in the drawings may differ in practice for the sake of convenience for drawing preparation. Furthermore, the elements of configuration described in the above embodiment are merely examples and not particular limitations. The elements of configuration may be variously altered within a scope not substantially departing from the effects of the present disclosure.

In the embodiment, the robotic device 10 has six degrees of freedom, but the present disclosure is not limited to this. The robotic device 10 may have five or fewer degrees of freedom, or seven or more degrees of freedom.

What is claimed is:

1. A robotic device comprising:
an end effector device including two fingers for gripping a workpiece;
a first sensor configured to detect a pressure distribution on a gripping position on the workpiece by the two fingers;
a second sensor configured to detect gripping torque on the workpiece; and
a controller configured to perform, based on a temporal variation in the pressure distribution when the workpiece is lifted, posture control including rotation of the end effector device, wherein
the controller includes a learning section which, based on a plurality of trials including the gripping of the workpiece using the two fingers and movement and rotation of a tool center point of the end effector device, performs supervised learning having been provided as learning data the temporal variation in the pressure distribution, a movement amount, a rotation amount, and a movement speed of the tool center point, and the gripping torque and having been provided as a label a movement amount of the pressure distribution after the rotation, and
the learning section determines, based on a result of the supervised learning, the movement amount and the rotation amount of the tool center point to decrease the movement amount of the pressure distribution after the posture control.

2. The robotic device according to claim 1, wherein
based on a result of the supervised learning having been further provided as learning data the gripping torque prior to the rotation, under a condition where the movement amount of the pressure distribution after the posture control is greater than a first threshold, the learning section determines the gripping torque prior to the posture control to decrease the gripping torque prior to the posture control.

3. The robotic device according to claim 1, wherein
under a condition where the movement amount of the pressure distribution after the posture control is greater than a second threshold, the learning section determines a movement speed of the tool center point such that the movement speed of the tool center point is high.

4. The robotic device according to claim 1, wherein
based on a result of the supervised learning having been further provided as learning data the gripping torque after the rotation and the temporal variation in the pressure distribution after the rotation, under a condition where the movement amount of the pressure distribution after the posture control is greater than a third threshold, the learning section determines the gripping torque after the posture control to decrease the gripping torque after the posture control.

5. The robotic device according to claim 1, wherein
when a movement amount of the pressure distribution is greater than a fourth threshold when the workpiece is lifted, the controller performs control so as to retry gripping of the workpiece using the two fingers.

6. A gripping method for gripping a workpiece using a robotic device including an end effector device a first sensor, and a second sensor, the end effector device including two fingers, the first sensor for detecting a pressure distribution on a gripping position on the workpiece by the two fingers, the second sensor for detecting gripping torque on the workpiece, the gripping method comprising:
gripping the workpiece using the two fingers;
detecting a pressure distribution on a gripping position on the workpiece; and
performing, based on a temporal variation in the pressure distribution when the workpiece is lifted, posture control including rotation of the end effector device,
performing, based on a plurality of trials including the gripping of the workpiece using the two fingers and movement and rotation of a tool center point of the end effector device, supervised learning having been provided as learning data the temporal variation in the pressure distribution, a movement amount, a rotation amount, and a movement speed of the tool center point, and the gripping torque and having been provided as a label a movement amount of the pressure distribution after the rotation; and
determining, based on a result of the supervised learning, the movement amount and the rotation amount of the tool center point to decrease the movement amount of the pressure distribution after the posture control.

7. The gripping method according to claim 6, wherein the gripping method further comprises determining, based on a result of the supervised learning having been further provided as learning data the gripping torque prior to the rotation, under a condition where the movement amount of the pressure distribution after the posture control is greater than a first threshold, the gripping torque prior to the posture control to decrease the gripping torque prior to the posture control.

8. The gripping method according to claim 6, further comprising
determining, under a condition where the movement amount of the pressure distribution after the posture control is greater than a second threshold, a movement speed of the tool center point such that the movement speed of the tool center point is high.

9. The gripping method according to claim 6, wherein
the gripping method further comprises determining, based on a result of the supervised learning having been further provided as learning data the gripping torque after the rotation and the temporal variation in the pressure distribution after the rotation, under a condition where the movement amount of the pressure distribution after the posture control is greater than a third threshold, the gripping torque after the posture control to decrease the gripping torque after the posture control.

10. The gripping method according to claim 6, further comprising
retrying the gripping of the workpiece using the two fingers when a movement amount of the pressure distribution when the workpiece is lifted is greater than a fourth threshold.

* * * * *